UNITED STATES PATENT OFFICE

GUS A. WELLS, OF HOPKINSVILLE, KENTUCKY.

IMPROVEMENT IN WRITING-INKS.

Specification forming part of Letters Patent No. 199,883, dated January 29, 1878; application filed November 9, 1877.

*To all whom it may concern:*

Be it known that I, GUS A. WELLS, of Hopkinsville, in the county of Christian and State of Kentucky, have invented a new and Improved Ink; and I do hereby declare that the following is a full, clear, and exact description of the same.

The object of my invention is to provide for use upon state and government records and documents, also in banking and other kinds of business, a writing fluid or ink which is indelible, and will therefore afford the desired protection against loss, either by forgery or the effect of the atmosphere or moisture.

The ink is composed of the following ingredients, in the proportions named: Aqua pura, one gallon; sodii boras, two ounces, (av.;) shellac, two ounces; lamp-black, two and a half ounces; alcohol, two ounces; aqua ammonia, one dram; spirits camphora, one dram.

Put seven pints of the aqua pura in a suitable vessel with the sodii boras and shellac; place on fire and warm up gradually to boiling-heat, stirring continually. Add the aqua ammonia and spirits camphora to the alcohol, and mix well with the lamp-black in another vessel. Then add the one pint of aqua pura, mix well, and pour slowly into the boiling solution, stirring the two solutions well together. Let boil about five minutes, remove from fire, and strain while hot, through fine muslin.

The ink thus produced has a very dark color, flows freely from the pen, will resist water, and is also ineffaceable by all known chemical agents. In fact it cannot be removed from the paper upon which it is used without removing the surface of the paper with it. It is practically indestructible as printer's ink, its base (carbon) being the same.

I am aware it is not new to combine camphor and lamp-black with a shellac solution, nor is it, broadly, new to use borax and water as a solvent for shellac in the manufacture of inks; and I do not, broadly, claim these combinations.

What I claim is—

The ink or writing-fluid formed of sodii boras, shellac, lamp-black, camphora, alcohol, and aqua ammonia dissolved in water, substantially in the proportions specified.

GUS A. WELLS.

Witnesses:
JAMES A. WALLACE,
JOHN C. LATHAM.